United States Patent [19]
Gelleknik

[11] 3,979,748
[45] Sept. 7, 1976

[54] PULSE RADAR APPARATUS
[75] Inventor: Bernard Gellekink, Ootmarsum, Netherlands
[73] Assignee: Hollandse Signaalapparaten B.V., Hengelo, Netherlands
[22] Filed: Feb. 14, 1975
[21] Appl. No.: 549,771

[30] Foreign Application Priority Data
Feb. 28, 1974 Netherlands .................... 7402687

[52] U.S. Cl. ........................ 343/7.7; 343/17.2 PC
[51] Int. Cl.² .................... G01S 9/233; G01S 9/42
[58] Field of Search .............. 343/7.7, 17.2 PC

[56] References Cited
UNITED STATES PATENTS

| | | |
|---|---|---|
| 3,225,349 | 12/1965 | Thor .................................... 343/7.7 |
| 3,263,227 | 7/1966 | Ferry et al. .................. 343/17.2 PC |
| 3,720,950 | 3/1973 | Vehrs, Jr. .......... 343/17.2 PC;7.7 X |
| 3,905,033 | 9/1975 | Moore et al. ....................... 343/7.7 |
| 3,942,035 | 3/1976 | Buss ............................... 343/7.7 X |

Primary Examiner—T.H. Tubbesing
Attorney, Agent, or Firm—Frank R. Trifari; George B. Berka

[57] ABSTRACT

A long-range pulse radar apparatus emitting linear F.M. pulses and coherently detecting radar returns contains a chirp generator with a phase-control unit, a slope-control unit and a timing circuit. The timing circuit, supplied with a voltage resulting from the phase detection of the VCO output signal with reference to the COHO signal, determines the times when the VCO phase control voltage is to be gradually replaced by the slope-control circuit output. The latter output is determined by the period required to generate a given number of periodic variations of the signals obtained through the phase detection of the VCO output signal with reference to a fixed-frequency signal.

2 Claims, 1 Drawing Figure

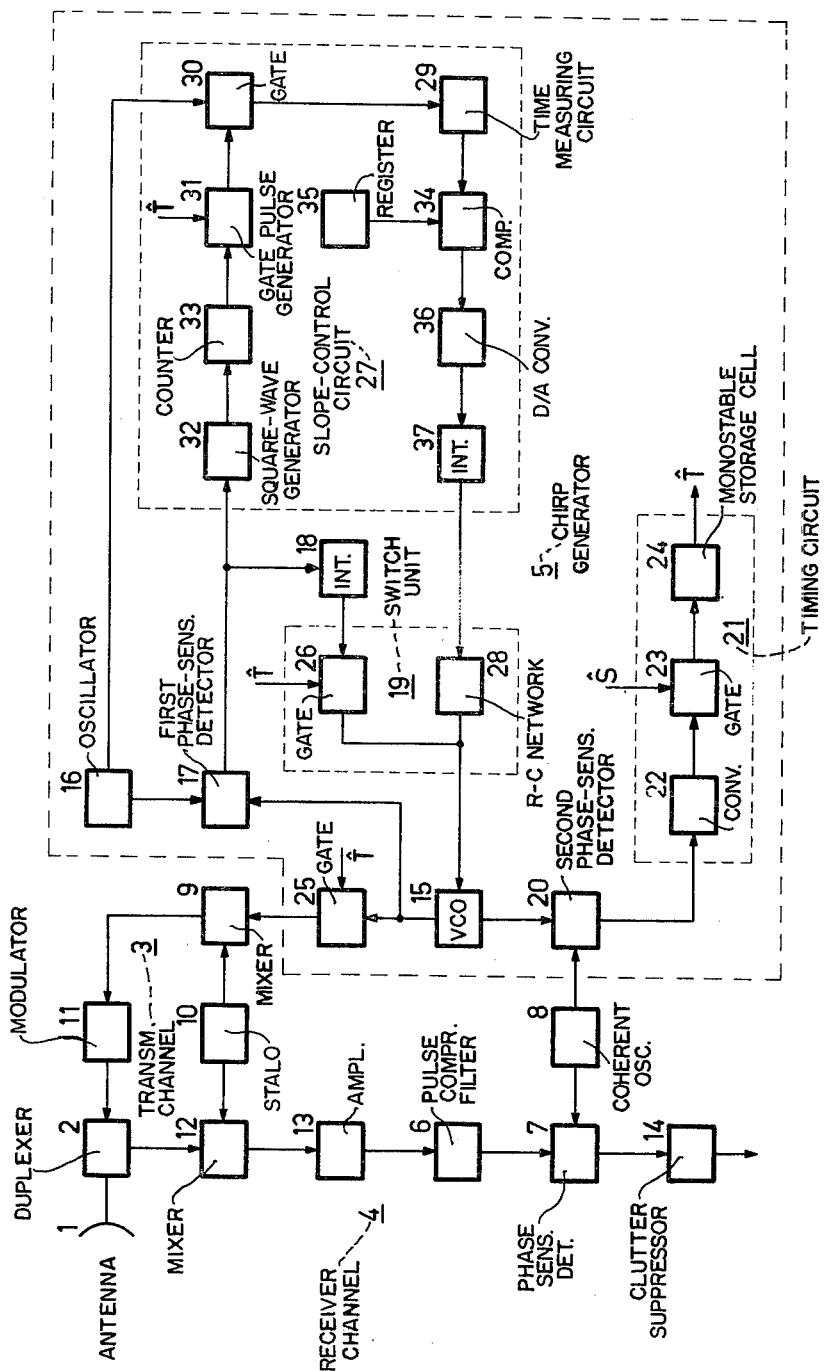

# PULSE RADAR APPARATUS

The invention relates to a pulse radar apparatus, in which the transmitter channel contains a circuit that is phasecontrolled by a coherent oscillator (COHO) for the active generation of linear F.M. pulses of relatively long duration by the use of a voltage-controlled oscillator (VCO), and in which the receiver channel comprises successively a pulse compression filter for the compression of applied radar returns into output pulses of relatively very short duration, a coherent detector for the detection of said output pulses, and means for the elimination of stationary-target signals obtained by the coherent detection.

The phase-controlled circuit for the active generation of linear F.M. pulses of relatively long duration is hereinafter termed a chirp generator and the means for the elimination of these stationary target signals a clutter suppressor.

Pulse radar apparatuses of the above type are widely known and find their use in long-range air surveillance and air traffic control, for which the demands made on transmitting power, antenna amplification and receiver sensitivity have been raised considerably.

Raising these demands may involve intensification of clutter, so that detection of moving target returns is impaired and the false-alarm rate is adversely affected. These disadvantages may substantially be reduced by a radar apparatus with such provisions that the signal-to-clutter ratio is improved and the clutter is eliminated to a considerable extent.

Improvement of the signal-to-clutter ratio may be obtained by reducing the resolution cell, resulting in a greater resolving power through improvement of the resolution in range. An obvious solution to this problem lies in the reduction of the transmitter pulse duration. Such a reduction however results in a decrease in the average transmitting power of the radar apparatus and is therefore an encumbrance to obtaining a large coverage for this apparatus.

The advantages gained by reducing the transmitter pulse duration and by increasing the average power are combined by applying the pulse compression technique; it is thus possible to extend the effective duration of the transmitter pulse (which is to the benefit of a large coverage of the radar) and to reduce the resolution cell (benefiting the resolving power) by using a specific frequency modulation of the transmitter pulse.

In view of the frequency modulation of the transmitter pulse, it should be ensured that the frequency modulation factor is inversely proportional to the compression factor of the delay line in the pulse compression filter. Only then all signals having the desired phase are applied to the delay line; it is therefore essential that the F.M. factor be kept substantially constant.

To be able to eliminate clutter signals, a coherent MTI technique can successfully be applied by using a coherent detector in combination with a delay line canceller in the receiver channel. This elimination process gives good results, provided that the initial phase of the chirp signal is derived through the coherent oscillator output signals and that this phase shows a substantially constant difference with respect to the momentary output signal of the coherent oscillator.

Hence, in a pulse radar apparatus for large coverage it is advisable to utilise the advantages associated with the application of pulse compression and coherent MTI. To obtain a favourable result, the modulated pulse-shaped chirp signals are to be supplied at a fixed initial frequency and a fixed initial phase, while they should vary to a constant F.M. factor.

Since the major source of errors in the detection and selection process of radar returns from both stationary and moving targets was found in the subtraction process in the clutter suppressor, the errors being caused particularly by variations in the modulation factor with the generation of the chirp signals, it was desirable to pay particular attention to this matter.

In accordance with the present invention the chirp generator is thereto provided with a phase-control circuit, a slope-control circuit, a timing circuit and a switch unit. The phase- and the slope-control circuits are fed with the VCO output signal that is phase-detected using the constant output signal of a fixed frequency oscillator as reference. In the time interval when the magnitude of the coherently detected VCO output signal exceeds a fixed value, the timing circuit delivers a timing signal to the switch unit, realising that, in the absence of the timing signal, the phase-control circuit produces a control voltage for the VCO to obtain coherent operation between the VCO and the fixed frequency oscillator, and that, in the presence of the timing signal, the VCO control voltage produced by the phase-control circuit is gradually replaced by the slope-control circuit output signal determined by the length of a period for generating a given number of periodic variations of the phase-detected output signal within said time interval.

For a better understanding of the invention and its advantages reference should be had to the accompanying drawing, which illustrates a block diagram of an embodiment of a pulse radar apparatus in accordance with the invention. The radar apparatus illustrated in the block diagram comprises an antenna 1 connected via a duplexer 2 to a transmitter channel 3 and a receiver channel 4. To apply the pulse compression technique to this apparatus, transmitter channel 3 is provided with a chirp generator 5, suitable to generate linear F.M. pulses of relatively long duration, while receiver channel 4 contains a pulse compression filter 6, which compresses the F.M. pulses to output pulses of relatively short duration. The momentary frequency $f_t$ of the chirp signal may be represented by: $f_t = f_0 - \mu t/2\pi$. t in MHz, where $f_0$ is a fixed frequency in the intermediate frequency range and $\mu(=2\pi df/dt)$ the F.M. factor. To be able to discriminate between returns from moving targets and returns from stationary targets, coherent MTI technique is applied with respect to the output pulses of pulse compression filter 6. The radar apparatus thereto contains also a phase sensitive detector 7 and a coherent oscillator 8, of which the output signal is used for two purposes. On the one hand, this output signal is applied to chirp generator 5 for the purpose of starting each of the pulse-shaped chirp signals with the same phase; on the other hand, the coherent oscillator output signal is applied to phase-sensitive detector 7 for the purpose of the phase detection of the radar returns. The chirp signals are to be generated at a fixed initial frequency $f_t = f_0 - \mu/2\pi \cdot t$ and a fixed initial phase at accurately determined instances, and are to be supplied to a mixer 9, which also receives the output signal of a stable local oscillator (STALO) 10. The transmitting frequency of the mixer output signal has the desired value, viz. $f_z = f_z - \mu/2\pi \cdot t$. This output signal is amplified inn an RF amplifier/pulse modulator 11 and converted into a high-power transmitter pulse, which is emitted via duplexer 2 and antenna 1.

The return signal received by antenna 1 is passed via duplexer 2 to a mixer 12, which also receives the STALO output signal. the IF output signal thus produced in mixer 12 is, after amplification in an IF amplifier 13, applied to pulse compression filter 6, comprising a dispersive line. Since the pulse compression filter 6 delays higher frequency signals to a greater extent than lower frequency signals, the chirp signal should first start at the highest frequency; this also explains the choice of the frequency formula: $f=f_o-\mu/2\pi.t$ for the chirp signal.

The output signal of pulse compression filter 6 is fed to phase-sensitive detector 7 for coherent detection. The coherently detected output signals are supplied to a clutter suppressor 14, in which returns from stationary objects are eliminated. Clutter suppressor 14 may be of various designs. In its simplest design this suppressor comprises two channels fed with coherently detected returns, a difference circuit connected to the output of each of the two channels, and a memory incorporated in one of these channels. The signals passing through the channel that contains the memory are delayed with respect to the signals passing through the other channel, the delay time being equal to one pulse repetition time. Instead of such a single clutter suppressor, a double clutter suppressor is often used in practice or even a triple one. Since the major source of errors in the detection process of the radar apparatus occurs during the elimination process in clutter suppressor 14, the errors being caused by the variations in the modulation factor, it was desirable to pay particular attention to this matter in the design of chirp generator 5. This generator had to be so designed that it delivers an F.M. signal starting at a fixed phase and a fixed initial frequency, and varying in accordance with a desired fixed F.M. factor.

To be able to derive an F.M. output signal at a fixed initial frequency $f_o$ from chirp generator 5, this generator is provided with at least a voltage-controlled oscillator (VCO) 15, a fixed frequency oscillator 16 and a phase control circuit comprising a first phase-sensitive detector 17, a first integrator 18 and a switch unit 19. To obtain a fixed phase relationship between the VCO output signal and the output signal of oscillator 16, both these output signals are fed to phase sensitive detector 17, which produces an output voltage that, in the embodiment in question, is proportional to the cosine of the phase difference between the two signals applied. The output signal of detector 17 is applied to integrator 18, producing a control voltage used to derive the fixed phase relationship between the output signals of the VCO 15 and oscillator 16. A result of this phase control process is that the VCO 15 is tuned to the fixed frequency oscillator 16.

To establish the instant at which the phase of the VCO output signal shows a fixed difference with the phase of the COHO signal, the chirp generator 5 is provided with a second phase-sensitive detector 20, that receives both the COHO and the VCO output signals. Detector 20 also produces an output voltage that, in the embodiment in question, is proportional to the cosine of the phase difference between the two signals applied to this detector. The output signal of detector 20 is fed to a timing circuit 21, which determines from the phase variation of each of these output signals an instant, at which the phase of the VCO output signal to be generated shows a fixed difference with that of the COHO output signal. Timing circuit 21 therefore starts the generation of a timing signal, to be maintained for a fixed period, at the first instant following a synchronisation signal when the phases of the above-mentioned detector output signals show the desired fixed difference. In the embodiment in question, timing circuit 21 thereto contains a convertor 22, and AND gate 23 and a monostable storage cell 24. In converter 22 the detector output signal is converted into a square-wave voltage. On the application of this voltage and the synchronisation signal to AND gate 23, the storage cell 24, under control of detector 20, deliveres a timing signal during a fixed period, in which period the VCO output signal can be generated to produce a transmitter pulse. Chirp generator 5 is thereto provided with a gate 25, which is opened on the application of the timing signal, allowing the VCO output signal to be applied as a chirp signal to mixer 9. As soon as gate 25 is open, the frequency modulation of the output signal should commence; switching unit 19 thereto contains a gate 26, which is blocked by the timing signal, while chirp generator 5 also comprises a slopecontrol circuit 27, of which the output voltage can be discharged over an R-C network 28 contained in switch unit 19. With gate 26 in te open condition, the output voltage of R-C network 28 contributes for a small part to the VCO control voltage, while the remaining part of this control voltage is obtained through the feedback circuit formed by phase-sensitive detector 17, integrator 18 and gate 26. With gate 26 in the closed condition, only the voltage of the slope-control circuit 27 contributes to the VCO control voltage, so that the voltage required for the initial setting of oscillator 15, varies exponentially with the output voltage of slope-control circuit 27 through the incorporation of R-C network 28. VCO 15 and R-C network 28 are thereby so dimensioned that an exponential variation in the control voltage results in a linear time variation of the VCO signal frequency.

The major task of slope-control circuit 27 is to make corrections in the F.M. factor in case of variations int eh slope of the linear frequency of the VCO signal. This may be realised by changing the output voltage of slope-control circuit 27. Consequently, the frequency is always of the same value when gate 25 closes. To determine the corrections to be made to the F.M. factor, the time required to measure a given number of periods of the variable output signal of phasesensitive detector 17 is compared with the desired time corresponding to the correct F.M. factor $\mu$. Any differences are converted into an error voltage, producing after integration the output voltge of slope-control circuit 27. To measure the F.M. FACTOR $\mu$, the output signal of phase-sensitive detector 17 is used. During the listening time this output signal is 0 V, as the VCO 15 is tuned to the fixed freuqency oscillator 16 through the feed-back loop containing the phase sensitive detector 17 and the integrator 18. If now on the supply of the timing signal the gate 26 is closed, so that VCO 15 cannot be tuned to oscillator 16, and further the VCO frequency changes under the influence of the exponentially varying VCO control voltage, the phase difference between the signals applied to detector 17 also changes, and detector 17 produces a sinusoidal output voltage. As the fixed frequency oscillator 16 delivers a voltage A cos $\omega_1 t$ and the VCO 15 a voltage B cos $(\omega_1-\pi/2-\tfrac{1}{2}\lambda t^2)$, the output voltage of phase-sensitive detector 17 is: C cos $(\omega_1 t - \pi/2 - \frac{1}{2}\mu t^2 - \omega_1 t) = -C \sin(\frac{1}{2}\mu t^2)$. It is desired to measure the time required for a given number of (k) periods of the variable output signal $-C \sin(\frac{1}{2}\mu t^2)$ of the phase-sensitive detector 17 and to compare this time with the desired time corresponding to the correct F.M. factor. The time required for k periods is obtained from the relationship: $\frac{1}{2}\mu t^2 = k \cdot 2\pi$, giving $=4k/\beta$. A change $\Delta\mu$ in the F.M. factor $\mu$ causes a change ($\Delta t$) in the time required for k periods, in accordance with the relationship: $\Delta\mu = -2\mu/t\Delta t$. By measuring $\Delta t$, the change $\Delta\mu$ of the required $\mu$ can be calculated. The slope control circuit 27 thereto comprises a time measuring circuit 29, which can be supplied with clock pulses from oscillator 16 through a gate 30 contained in circuit 27 during the time required for the k periods. Gate 30 must therefore be open at the start of this time; this is realised with the aid of a gate pulse generator 31, which thereto activates gate 30 as soon as timing circuit 21 also delivers a timing signal for the gate pulse generator 31. On the expiration of the k periods of the detector voltage, gate 30 is to be returned to the blocking condition, with the result that time measuring circuit 29 ceases counting the oscillator clock pulses still to be supplied. Slope-control circuit 27 is hereto provided with a square-wave generator 32 and a counter 33. The variable output signal of detector 17 is converted into a squarewave voltage in generator 32, the square waves being counted in counter 33. On the supply of the first k square waves t counter 33, this counteer delivers a stop pulse to gate pulse generator 31, causing gate 30 to return to the blocking condition. A comparator 34 compares the then obtained count position of time measuring circuit 29 with a fixed numeric value that is stored in a register 35. This value should also be in time measuring circuit 29 in the case of a correct F.M. factor. A difference in the applied value is converted into a voltage by a digital analogue converter 36, the magnitude of this voltage being proportional to the difference between the two numeric values and the polarity of this voltage depending on the magnitude of these values. The voltage thus obtained is applied to an integrator 37 to produce the desired output voltage of slopecontrol circuit 27.

What we claim is:

1. A pulse radar apparatus comprising, in the transmitter signal channel, a generator circuit to generate linear F.M. pulses of relatively long duration, and, in the receiver signal channel, means to compress radar return signals into output pulses of relatively short duration, means for phase detecting said short output pulses, a coherent oscillator controlling said phase detecting means, and means for the elimination of stationarytarget signals, said generator circuit including voltage controlled oscillating means, a fixed frequency oscillating means to generate a constant reference signal, first phase detecting means having one input coupled to the output of said voltage-controller oscillating means and another input to said fixed frequency oscillating means, to produce a first control signal; second phase detecting means coupled to the output of said voltage-controlled oscillating means and controlled by said coherent oscillator to produce a second control signal; a slope-control circuit supplied with said first control signal and with said reference signal to produce an output signal which is determined by the length of a period for generating a given number of periodic variations of said first control signal during the time interval when the second control signal exceeds a predetermined value; a timing circuit controlled by said second control signal and having means to produce a timing signal during the time interval when the second control signal exceeds the predetermined value, and switching means which, in the absence of said timing signal, apply said first control voltage to the input of said voltage controlled oscillating means and, in the presence of said timing signal, gradually replace the first control voltage with the output signal from the slope control circuit.

2. Pulse radar apparatus as claimed in claim 1 wherein the slope-control circuit comprises successively a counter to record periodic variations f* the phase-detected output signal, a time measuring circuit with a time interval lying between the instance of generation of a timing signal and the next instance at which the counter reaches a given count position, and a comparator for comparing the count position of the time measuring circuit, which position is recorded during said time interval, with a fixed numeric value corresponding with the desired frequency modulation factor, whereby any difference established by the comparator makes a correction to the output voltage of the slope-conrol circuit.

* * * * *

UNITED STATES PATENT AND TRADEMARK OFFICE
CERTIFICATE OF CORRECTION

PATENT NO. : 3,979,748
DATED : September 7, 1976
INVENTOR(S) : GERNARD GELLEKINK It is certified that error appears in the above-identified patent and that said Letters Patent are hereby corrected as shown below:

Col. 2, line 46, "$f_t = f_o - \mu\ 12\ \sqrt{\ }$" should be $-- f_t = f_o - \mu\ 2\sqrt{\ } --$;

line 68, "inn" should be --in--;

Col. 4, line 26, "te" should be --the--;

line 42, "int" should be --in--;

line 43, "eh" should be --the--;

line 54, "FACTOR" should be --factor--;

Col. 5, line 8, "$4k/\beta$" should be $-- t = \sqrt{4k/\mu}\ --$;

line 30, "t" should be --to--;

Claim 1, line 5, after "relatively" insert --very--;

Claim 2, line 3, "f" should be --of--;

line 14, "conrol" should be --control--.

Signed and Sealed this

Thirtieth Day of November 1976

[SEAL]

Attest:

RUTH C. MASON
*Attesting Officer*

C. MARSHALL DANN
*Commissioner of Patents and Trademarks*